United States Patent
Komatsu

(10) Patent No.: US 7,174,503 B2
(45) Date of Patent: Feb. 6, 2007

(54) INFORMATION RECORDING AND REPRODUCING APPARATUS

(75) Inventor: Yoshiaki Komatsu, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 696 days.

(21) Appl. No.: 09/820,006

(22) Filed: Mar. 29, 2001

(65) Prior Publication Data

US 2001/0051957 A1    Dec. 13, 2001

(30) Foreign Application Priority Data

Jun. 13, 2000   (JP) .............................. 2000-177209

(51) Int. Cl.
*G06F 17/00* (2006.01)

(52) U.S. Cl. .................... 715/500.1; 715/515; 715/530

(58) Field of Classification Search ................ 715/500, 715/500.1, 515, 516, 530
See application file for complete search history.

(56) References Cited

U.S. PATENT DOCUMENTS

| | | | |
|---|---|---|---|
| 5,136,125 A | | 8/1992 | Russell |
| 5,717,869 A | * | 2/1998 | Moran et al. ................ 345/716 |
| 5,717,879 A | * | 2/1998 | Moran et al. ................ 345/716 |
| 5,786,814 A | * | 7/1998 | Moran et al. ................ 345/720 |
| 5,818,436 A | | 10/1998 | Imai et al. |
| 5,986,655 A | * | 11/1999 | Chiu et al. ................... 345/839 |
| 6,239,801 B1 | * | 5/2001 | Chiu et al. ................ 715/500.1 |
| 6,332,147 B1 | * | 12/2001 | Moran et al. ............. 715/500.1 |
| 6,438,523 B1 | * | 8/2002 | Oberteuffer et al. ........ 704/270 |
| 6,529,920 B1 | * | 3/2003 | Arons et al. ............. 715/500.1 |
| 2002/0002562 A1 | * | 1/2002 | Moran et al. ................ 707/500 |

FOREIGN PATENT DOCUMENTS

| | | |
|---|---|---|
| JP | 7-13688 A | 1/1995 |
| JP | 7-73192 A | 3/1995 |
| JP | 7-78052 A | 3/1995 |

OTHER PUBLICATIONS

U.S. Appl. No. 09/636,818, filed Aug. 10, 2000; Okamoto et al.
U.S. Appl. No. 09/666,892, filed Sep. 20, 2000; Wakayama et al.
U.S. Appl. No. 09/659,754, filed Sep. 11, 2000; Tomomatsu et al.
U.S. Appl. No. 09/628,724, filed Jul. 28, 2000; Nagai et al.
U.S. Appl. No. 09/634,322, filed Aug. 7, 2000; Nagai et al.
U.S. Patent Application; filed Mar. 29, 2001; Tomomatsu.

* cited by examiner

*Primary Examiner*—Stephen Hong
*Assistant Examiner*—Gregory J. Vaughn
(74) *Attorney, Agent, or Firm*—Oliff & Berridge, PLC

(57) ABSTRACT

An information recording and reproducing apparatus provides users with an easy designation of a playback start position and a playback time. Sound data is sequentially stored in association with time data and information such as a letter and a symbol is inputted with a marker with which a user writes. When the user designates the letter or symbol with the marker, playback of the sound data recorded at an input start time of the letter or symbol is started. When the playback end is indicated using the marker, the playback of the sound data is terminated.

2 Claims, 10 Drawing Sheets

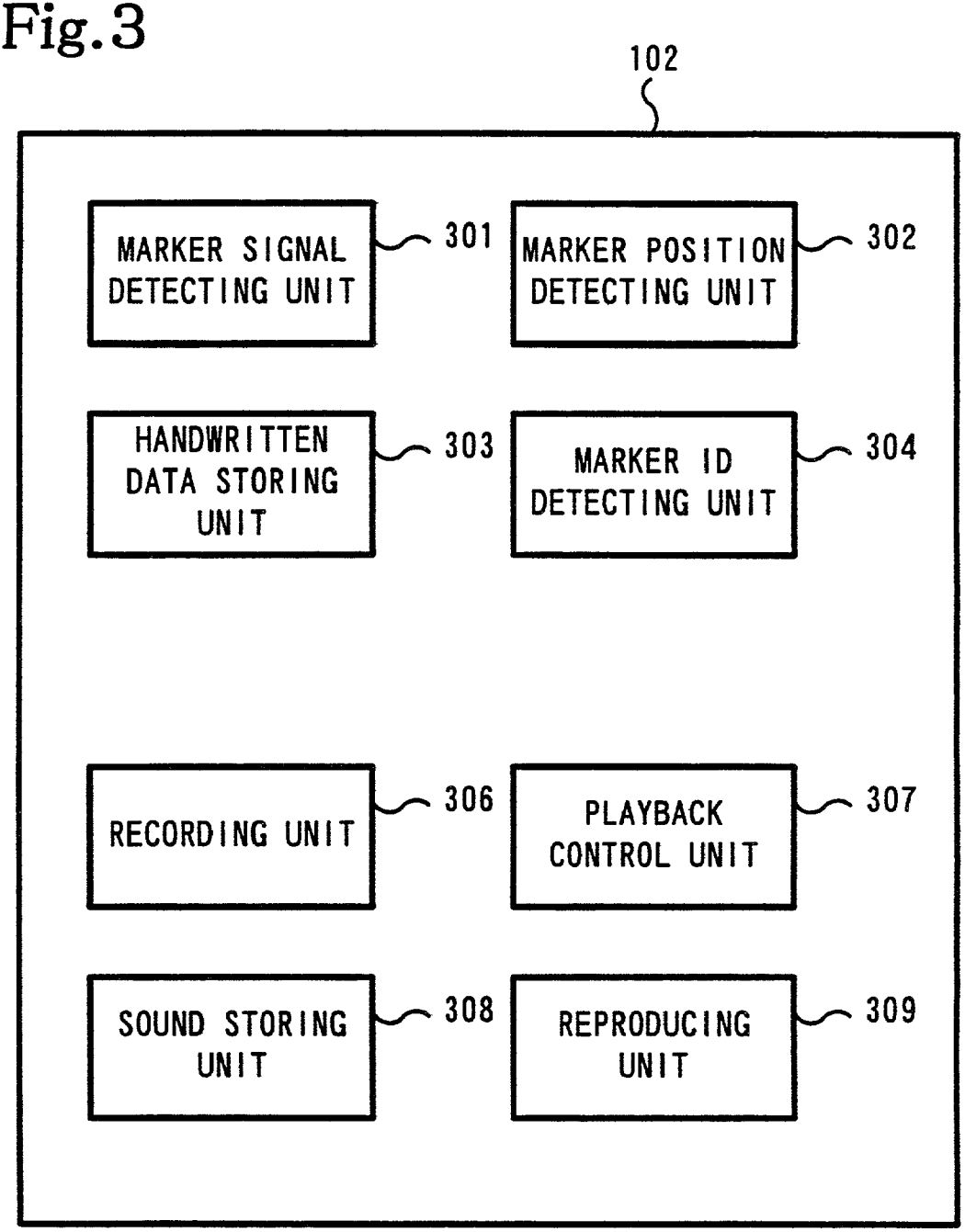

INFORMATION RECORDING AND REPRODUCING APPARATUS

BACKGROUND OF THE INVENTION

1. Field of the Invention

This invention relates to an information recording and reproducing apparatus capable of recording sound information, and stroke information and reproducing the sound information.

2. Description of the Related Art

There are related art apparatuses that continuously record and reproduce sounds and voices issued at a meeting for example. Conventional apparatuses are capable of recording sounds and voices continuously, storing notes as handwritten data, and playing back corresponding recorded sounds and voices later by designating the handwritten data.

For example, U.S. Pat. No. 5,818,436 corresponding to Japanese Laid-Open Patent Publication No. 6-343146 discloses an apparatus that plays back sound synchronized with handwritten data for a fixed period of time by clicking on the handwritten data.

In such an apparatus, however, as playback time is fixed, the playback may be finished before a user listens to a desired part, or the user may have to bear listening to an undesired part after listening to the desired part, as long as the playback is continued during the playback time.

In addition, sound that is not synchronized with handwritten data cannot be played back. Further, sound is not played back where an empty portion without notes is clicked or designated. As a result, the user has to listen to an unnecessary part until the desired part is played back.

SUMMARY OF THE INVENTION

The present invention provides an information recording and reproducing apparatus in which a user can easily adjust a playback start position and a playback time.

In an aspect of the invention, the information recording and reproducing apparatus comprises a sound data storing device that stores sound data in association with time data indicating an input time of the sound data; a writing information inputting device that includes a position designating portion and that is used for designating at least one of the positions on an input area using the position designating portion and inputting writing information; a playback selecting device that includes a switch and a position designating portion and that outputs a playback start signal and a playback end signal of the sound data by switching of the switch; a coordinate data detecting device that detects coordinate data of positions designated by the position designating portion of the writing information inputting device in association with times when the positions are designated by the position designating portion of the writing information inputting device, and that detects coordinate data of positions designated by the position designating portion of the playback selecting device; a writing information unit storing device that stores coordinate data of positions designated by the writing information inputting device, with the coordinate data divided according to a predetermined condition, as a writing information unit, in association with time data indicating an input time of the writing information unit; and a sound data playback device that starts a playback of the sound data from sound data stored in association with the input time of a writing information unit in response to an output of the playback start signal when playback-designated coordinate data of a position designated by the position designating portion of the playback selecting device is determined to be corresponding to the writing information unit, and that terminates the playback in response to an output of the playback end signal.

The sound data is stored by the sound data storing device. Concurrently, a certain position is designated by the position designating portion of the writing information inputting device, and the writing information is inputted. Coordinate data of the positions detected by the coordinate data detecting device are divided according to a predetermined condition and stored as a writing information unit by the writing information unit storing device, in association with time data indicating an input time area of the writing information unit. After the storing of the sound data is completed, the position is designated by the position designating portion of the playback selecting device, and coordinate data of the position is detected by the coordinate data detecting device. When the playback start signal of the sound data is outputted by switching the switch of the playback selecting device, it is determined whether the coordinate data of the position designated by the position designating portion of the playback selecting device corresponds to the writing information unit. If it is determined that the coordinate data corresponds to the writing information unit, sound data is played back by the sound data playback device starting from sound data stored in association with the input time of the writing information unit. Then, when the playback end signal is outputted by switching the switch of the playback selecting device, the sound data playback device terminates the playback. Therefore, the playback start and end of the sound data can be realized with the switching of the switch of the playback selecting device, so that the user can smoothly adjust the playback time.

BRIEF DESCRIPTION OF THE DRAWINGS

The invention will be described in greater detail with reference to exemplary embodiments thereof and the accompanying drawings wherein;

FIG. 3 is a block diagram of an input board in the information recording and reproducing apparatus of FIG. 1;

DESCRIPTION OF THE PREFERRED EMBODIMENTS

Exemplary embodiments of the invention will be described in detail with reference to the accompanying drawings.

Figure 1:
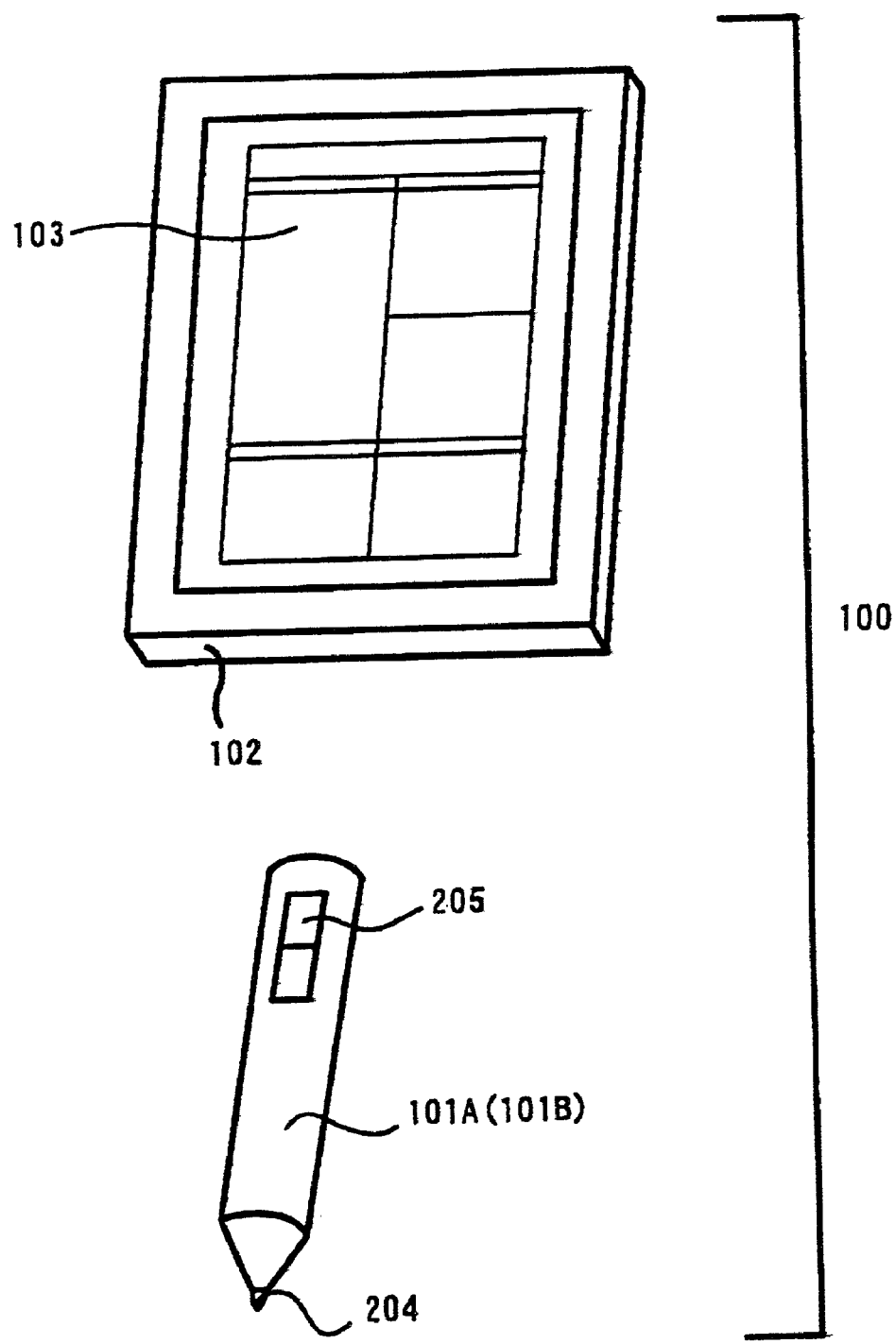
FIG. 1 is a perspective view showing a rough structure of an information recording and reproducing apparatus in a first exemplary embodiment of the invention.

As shown in FIG. 1, an information recording and reproducing apparatus 100 includes a marker 101A, a marker 101B (as will be further discussed below), and an input board 102. The structures of the respective markers 101A and 101B are similar and thus, only one device is depicted in FIG. 1 with reference to both markers 101A and 101B. The input board 102 is formed in a board as shown in FIG. 1. A recording sheet 103 is placed on the surface of the input board 102. In various exemplary embodiments, the recording sheet 103 includes an easy-peel-off adhesive on the back of the recording sheet 103. The recording sheet 103 is affixed to the surface of the input board 102 with sufficient adhesion. In various other exemplary embodiments regular paper is fixed to the surface of the input board 102 by a fixing device not shown.

A tip 204 of the marker 101A can be used to write on the regular paper as well as other writing tools, such as a pencil, a mechanical pencil, a ball-point pen, and a felt pen. The tip 204 of the marker 101A outputs a signal, the frequency of which is modulated to a predetermined value. The input board 102 functions as a magnetic coupling tablet. Therefore, when the user takes notes using the tip 204 of the marker 101A, letters and marks are written on the recording sheet 103 and a trail of the tip 204 is stored as a group of coordinate data by the magnetic coupling tablet. In this exemplary embodiment, storing of sound data is executed while the group of the coordinate data is stored. Based on an instruction of the marker 101B, which is structurally similarly to the marker 101A, the stored sound data is played back. The following are exemplary structural descriptions in detail.

Figure 2:
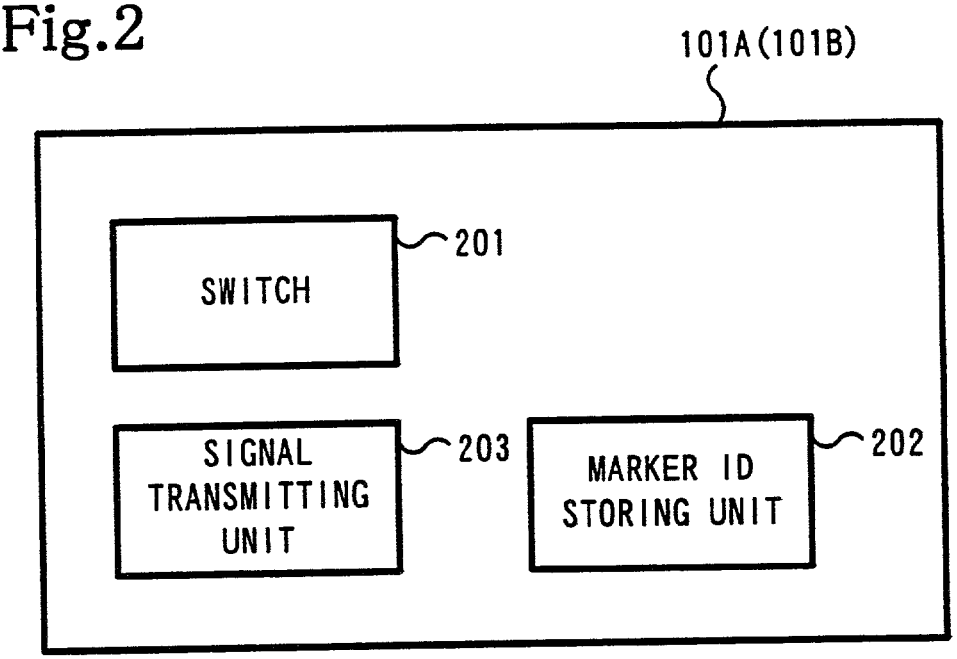
FIG. 2 is a block diagram of a marker in the information recording and reproducing apparatus of FIG. 1.

FIG. 2 is a block diagram showing a structure of the marker 101A and the marker 101B. The marker 101A is used to input stroke data. The marker 101B is used to play back the sound data. As the fundamental structure is common to both markers, it is described with reference to one drawing.

As shown in FIG. 2, each of the markers 101A and 101B includes a switch 201, a signal transmitting unit 203, and a marker ID storing unit 202.

The switch 201 is structured to work with the tip 204 of the marker 101A or 101B. As the tip 204 is moved vertically with minute strokes according to the pressure where the marker is pressed, the switch 201 is switched to on or off. In various exemplary embodiments, the switch 201 is set to on when the tip 204 is pressed against the recording sheet 103 and off when released.

The marker ID storing unit 202 is composed of a memory, and stores ID information of the marker 101A and the marker 101B respectively. In various exemplary embodiments, only one marker 101A is provided for inputting strings or a collection of stroke date. In various other exemplary embodiments, a plurality of different color markers are provided so that they each can store different ID information and if color information is stored with coordinate data, the color information can be reflected in printing and displaying.

In both markers 101A and 101B, when the signal switch 201 is turned on, the signal transmitting unit 203 outputs a frequency-modulated signal, a phase-modulated signal, and/or an amplitude-modulated signal via the tip 204. The frequency, duty, or amplitude of the modulated signals is set differently according to the ID information. The modulation is controlled by a microcontroller, not shown, in accordance with the ID information coded and stored in the memory. Instead of storing the ID information in the memory, a modulation circuit that outputs a signal corresponding to the ID information may be provided in the marker 101A and the marker 101B in advance, so that the modulation can take place in response to the ID information.

FIG. 3 is a block diagram of the input board 102. As shown in FIG. 3, the input board 102 includes a marker signal detecting unit 301, a marker position detecting unit 302, a handwritten data storing unit 303, a marker ID detecting unit 304, a recording unit 306, a playback control unit 307, a sound storing unit 308, and a reproducing unit 309.

The marker signal detecting unit 301 includes a magnetic coupling tablet, and is made up of magnetic coupling elements disposed in a matrix under the surface where the recording sheet 103 is placed. When each magnetic coupling element detects a signal issued from the marker 101A or 101B, the electromagnetic property of the element varies, which is captured as a change in output. The detection of the signal may be performed at a fixed cycle or continuously for a certain period. As the marker signal detecting unit 301 is of magnetic coupling, it can reliably receive output signals of the marker 101A or 101B via the electromagnetic elements even when the recording sheet 103 is placed on the surface of the marker signal detecting unit 301.

The marker position detecting unit 302 includes a tablet driver, and detects the change of the output of the magnetic coupling element as coordinate data.

The marker ID detecting unit 304 includes a CPU, and detects ID information included in an output signal of the marker 101A or 101B. The marker ID detecting unit 304 determines which marker is currently being used from the detection result.

Fundamental structures of the marker 101A, the marker 101B, the marker signal detecting unit 301, the marker position detecting unit 302, and the marker ID detecting unit 304 are realized in similar structures disclosed in U.S. Pat. No. 5,136,125, and commonly owned U.S. patent application Ser. Nos. 09/636,818, 09/666,892, 09/659,754, 09/628,724, 09/634,322 all of the disclosures of which are herein incorporated by reference.

The handwritten data storing unit 303 includes a CPU and a memory. When the ID information detected by the marker ID detecting unit 304 is the ID information included in an output signal of the marker 101A, the coordinate data detected by the marker position detecting unit 302 is stored in the memory. A trail of the marker 101A made by the user manually drawing on the recording sheet 103, is stored as stroke data that is a group of coordinate data in the memory. A collection of the stroke data makes up a string.

The handwritten data storing unit 303 obtains a current time from a timer disposed inside or outside the CPU. The handwritten data storing unit 303 stores time data indicating a time when the marker signal detecting unit 301 detects an output signal of the marker 101A, in association with the stroke data. The handwritten data storing unit 303 does not store times when the marker signal detecting unit 301 is continuously detecting the output signals. The handwritten data storing unit 303 stores a time of detecting an output signal indicating the first coordinates of the coordinate data that makes up the stroke data for a string, as input start time data of the stroke data for the string.

Thus, the string is not limited to stroke data, which is obtained from a one-stroke input. For example, when "telephone number of Mr. A" is written on the recording sheet 103 as shown in FIG. 6B, a collection of stroke data corresponding to a trail of each letter of the "telephone number of Mr. A" is regarded as one string. In other words, a collection of stroke data is treated as one string until the amount of the change in either the detected coordinate data or the detected time is beyond a predetermined amount. If the predetermined amount is exceeded, the next collection of stroke data is treated as another string. There may be cases where the predetermined amount is exceeded but the coordinate data is not effective because a detection time of an output signal for the coordinate data that makes up new stroke data is too short. In such cases, the coordinate data may not be stored as new stroke data. A collection of stroke data, which makes up one string, is stored in association with the input start time data.

The recording unit 306 includes a CPU, an A/D converter and a compression converter. The recording unit 306 converts sound signals, which are inputted via a microphone (not shown) provided in the input board 102, into digital signals, performs data compression in a predetermined format, and controls the writing of sound data into a memory. The recording unit 306 also obtains the current time from a timer disposed inside or outside the CPU. Recording time data is stored in the memory in association with the sound data. It is not necessary to write the recording time data in response to all sound data in a one-to-one relationship. For example, the recording time data may be stored in step with the sound data coming first in a predetermined unit for storing sound data. Even in such an arrangement, as long as a sampling rate or a rate of writing into memory is known, the sound data associated with the time data indicating a certain time can be searched and played back.

The sound storing unit 308 includes a memory, and stores sound data and time data which are outputted by the recording unit 306.

The playback control unit 307 includes a CPU, and controls searching of the sound data, the start of a playback, and the end of the playback according to the instruction of the marker 101B.

The reproducing unit 309 includes a D/A converter and a decompression converter, and reproduces sound data stored in the sound storing unit 308 based on the control by the recording control unit 307.

In various exemplary embodiments, the above-mentioned units of the input board 102 do not necessarily have their own respective CPUs and memories. The input board 102 can be structured so that the above-mentioned units are controlled by one CPU and stored in one memory.

A process according to the invention where the sound data and the stroke data are stored is described with reference to FIGS. 4A and 4B.

When the user performs an operation of the recording start, storing of the sound data and time data into the sound storing unit 308 is started by the recording unit 306. The recording start is executed by switching a switch (not shown), which is provided on the input board 102 or is a predetermined position of the top surface of the input board 102 where the recording sheet 103 is placed, designated by the marker 101A. In a case where the recording start is indicated using the marker 101A, it may be determined that the recording start is instructed when the output signal of the marker 101A is detected at a magnetic coupling element corresponding to the predetermined position of the top surface of the input board 102.

In various exemplary embodiments, the sound data may be sampled at a fixed sampling rate, and stored at a fixed transfer rate in a memory divided by a fixed memory capacity. The time data may be stored in a first area of a memory or a group of memories. With the adoption of such a data storing format, the sound data recorded at a certain time can be searched promptly and efficiently.

Figure 4A:
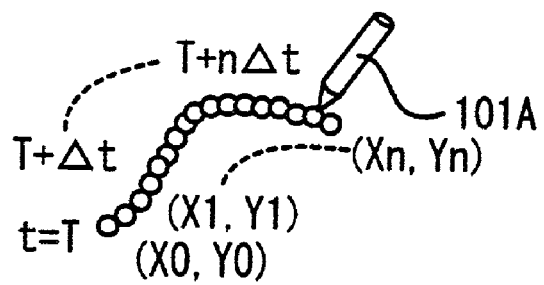
FIG. 4A illustrates an example of inputting a string in the information recording and reproducing apparatus of FIG. 1.

As to the stroke data, when the user starts inputting a string, which is made of one stroke or a collection of strokes, on the recording sheet 103 using the marker 101A as shown in FIG. 4A, the stroke data is stored into the memory. When the tip 204 of the marker 101A is pressed against the recording sheet 103, the switch 201 is set to on, and a signal is outputted from the signal transmitting unit 203. When the signal is detected by the marker signal detecting unit 301 of the input board 102, the handwritten data storing unit 303 stores the coordinate data detected by the marker position detecting unit 302 into the memory. Simultaneously, the handwritten data storing unit 303 stores the time data indicating the time when the signal is detected for the first time, as the input start time data, into the memory.

Figure 4B:
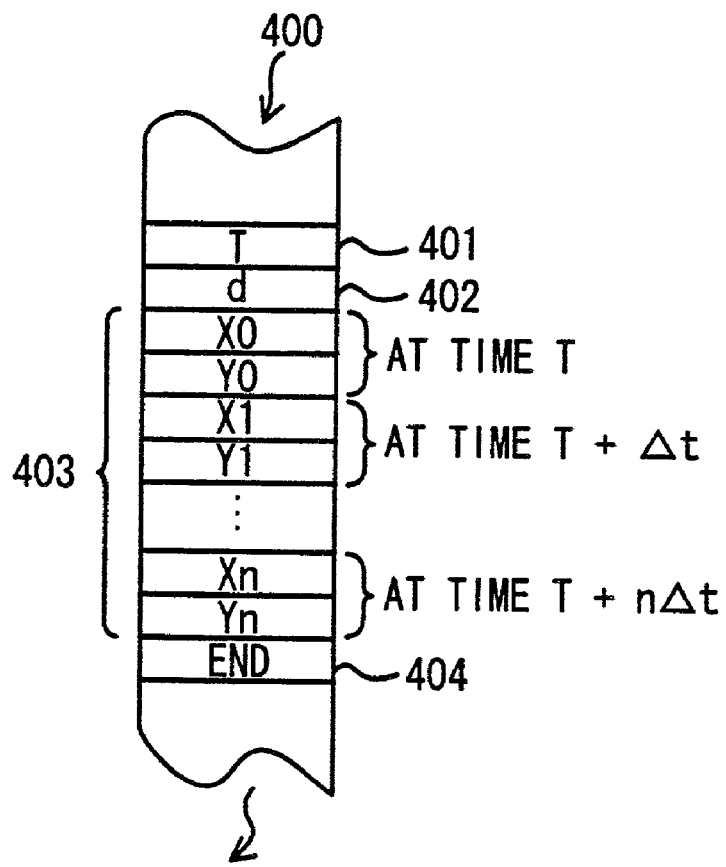
FIG. 4B illustrates a data storing format as to the inputted string.

FIG. 4B is an exemplary structure of data storage area. A storage area 400 includes a time data location 401, an attribute data location 402, a coordinate data location 403, and an end data location 404.

An input start time is stored in the time data location 401. For example, as shown in FIG. 4A, when input is started at time T, time T is stored in the time data location 401.

In the attribute data location 402, attribute data is stored. The attribute data describes an attribute of a past event related with the data. For example, the attribute may indicate that the stored coordinate data is input data or erased data.

In the coordinate data location 403, stored is the coordinate data of the tip 204 of the marker 101A sampled every $\Delta t$ seconds by the marker position detecting unit 302. For example, assuming that the coordinate data at time T is (x0, y0), the coordinate data at time T+$\Delta t$ is (x1, y1), and the coordinate data at time T+n$\Delta t$ is (xn, yn) as shown in FIG. 4A, the x coordinate data and the y coordinate data are stored in the order as shown in FIG. 4B.

In the end data location 404, an end data is stored. The end data indicates the end of a series of coordinate data. Therefore, a group of coordinate data that is delimited with the end data is recognized as a group of coordinate data that makes up one string. A value that does not exist as the coordinate data is used as the end data. For example, a value greater than the maximum value of the coordinates or less than the minimum value of the coordinates is used.

When a string, which has already been inputted on the recording sheet 103, is deleted, the string is overwritten in an erase mode. The marker 101A is provided with a selective switch 205 (shown in FIG. 1) that allows switching between the input mode and the erase mode. The marker ID storing unit 202 stores the ID information of the input mode and the ID information of the erase mode in advance. Based on the ID information of a mode selected by the switching of the selective switch 205, the marker 101A performs the modulation and outputs a signal corresponding to the selected mode, i.e., input or erase. In various other exemplary embodiments, the selective switch is disposed on the input board 102, rather than on the marker 101A and switching to the erase mode is made via the selective switch. So as to facilitate the setting of the erase mode, the user may designate an area determined for the erase mode on the tablet using the marker 101A. Further, the marker 101A may be provided with a sensor that self-recognizes its posture, so that the marker 101A is in the input mode when the marker 101A is in normal position and in the erase mode when the marker 101A is placed upside down. In various other exemplary embodiments, an eraser or a portion equivalent to the eraser may be provided at the rear end opposite to the tip 204 of the marker 101A, so that the marker 101A is in the erase mode when input is done using the eraser or the portion equivalent to the eraser. In this case, the eraser or the portion equivalent to the eraser includes a switch that is similar to the switch 201 that is activated when the eraser or the portion equivalent to the eraser is pressed against the recording sheet 103. Various other exemplary embodiments include a marker that is used only for the erase mode.

When an input is made in the erase mode, data indicating an attribute of deletion is stored in the attribute data location 402. For example, in various exemplary embodiments, a "0" stored in the data location 402 indicates a data attribute of an input mode input and a "1" stored in the data location 402 indicates a data attribute of an erase mode input. The coordinate data location 403 can be used as a storable area for newly input coordinate data.

A determination as to whether an input is completed is based on a new input within a certain period of time, an indication by the marker 101A at a determined area of the tablet, or switching of the selective switch provided in the marker 101A or the input board 102. When the completion of the input is recognized, the end data is stored in the end data location 404.

Figure 5:
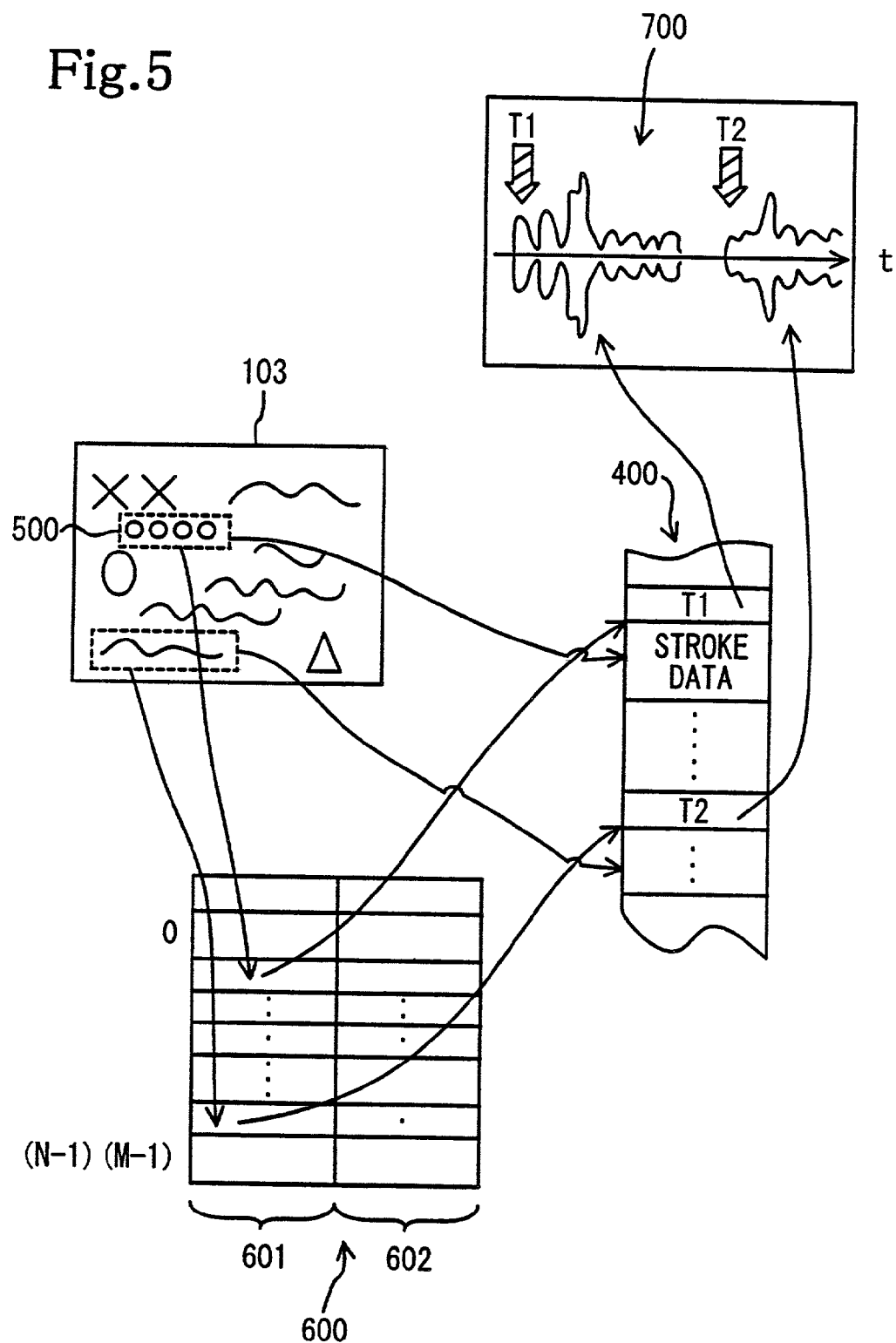
FIG. 5 illustrates a playback process of the information recording and reproducing apparatus of FIG. 1.

When the input is completed as mentioned above, the handwritten data storing unit 303 defines an area including the string as, for example, a rectangular string area 500 as shown in FIG. 6B. The handwritten data storing unit 303 stores a memory addresses of the string area 500 and the storage area 400 in an address table 600, as shown in FIG. 5. The address table 600 includes a first storage area 601 and a second storage area 602, where addresses corresponding to coordinates existing on the tablet are stored. Memory addresses of the storage area 400 are stored in each of the first storage area 601 and the second storage area 602. Two storage areas, namely the first and second storage areas 601 and 602, are provided to be able to cope with a case where a plurality of string areas 500 are defined having the same coordinates.

A playback process by the playback control unit 307 is described with reference to FIGS. 5 through 7.

Figure 6A:
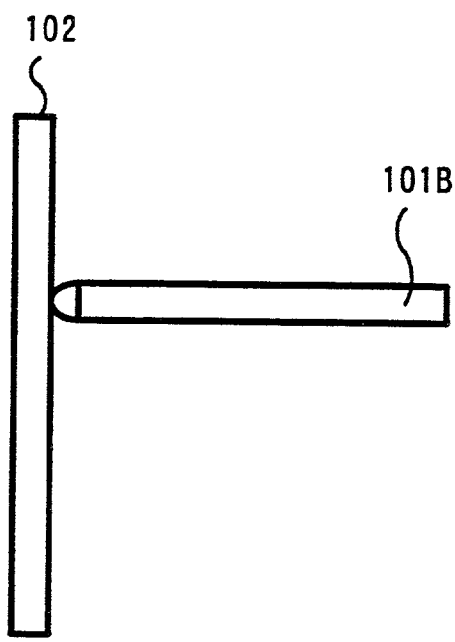
FIG. 6A is a side view showing an indication of playback in the information recording and reproducing apparatus of FIG. 1.
Figure 6B:
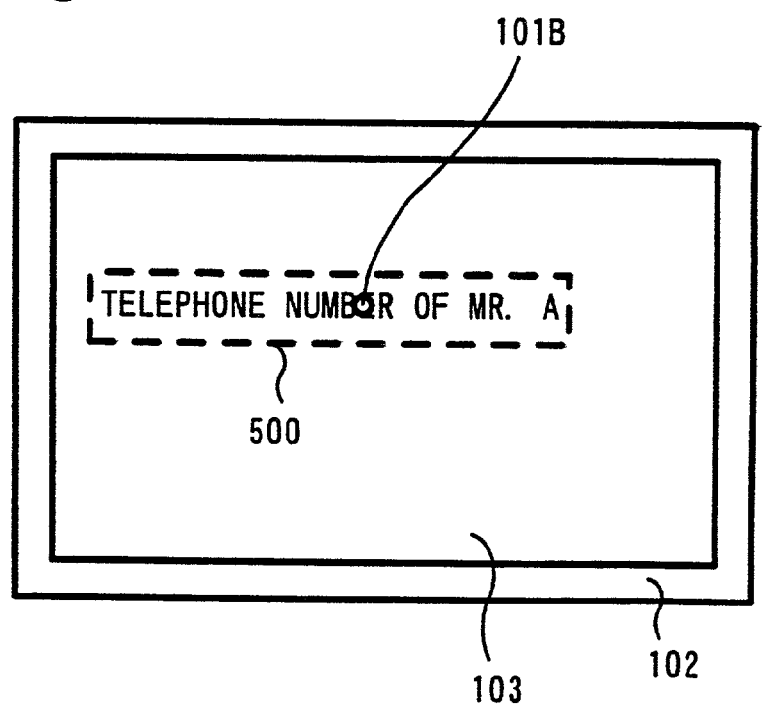
FIG. 6B is a plan view of FIG. 6A.

To play back the recorded sound after inputting at least one string, which is defined as mentioned above, the user uses the marker 101B instead of the marker 101A, and designates a position of the string as shown in FIGS. 6A and 6B. The position to be designated does not necessarily have to be in exact agreement with the string. As long as the position is included in the string area 500, it is assumed that the string is selected. Therefore, the user can easily designate a desired string. After all desired strings are selected, the recorded sound corresponding to a selected string or strings can be played back.

Figure 7:
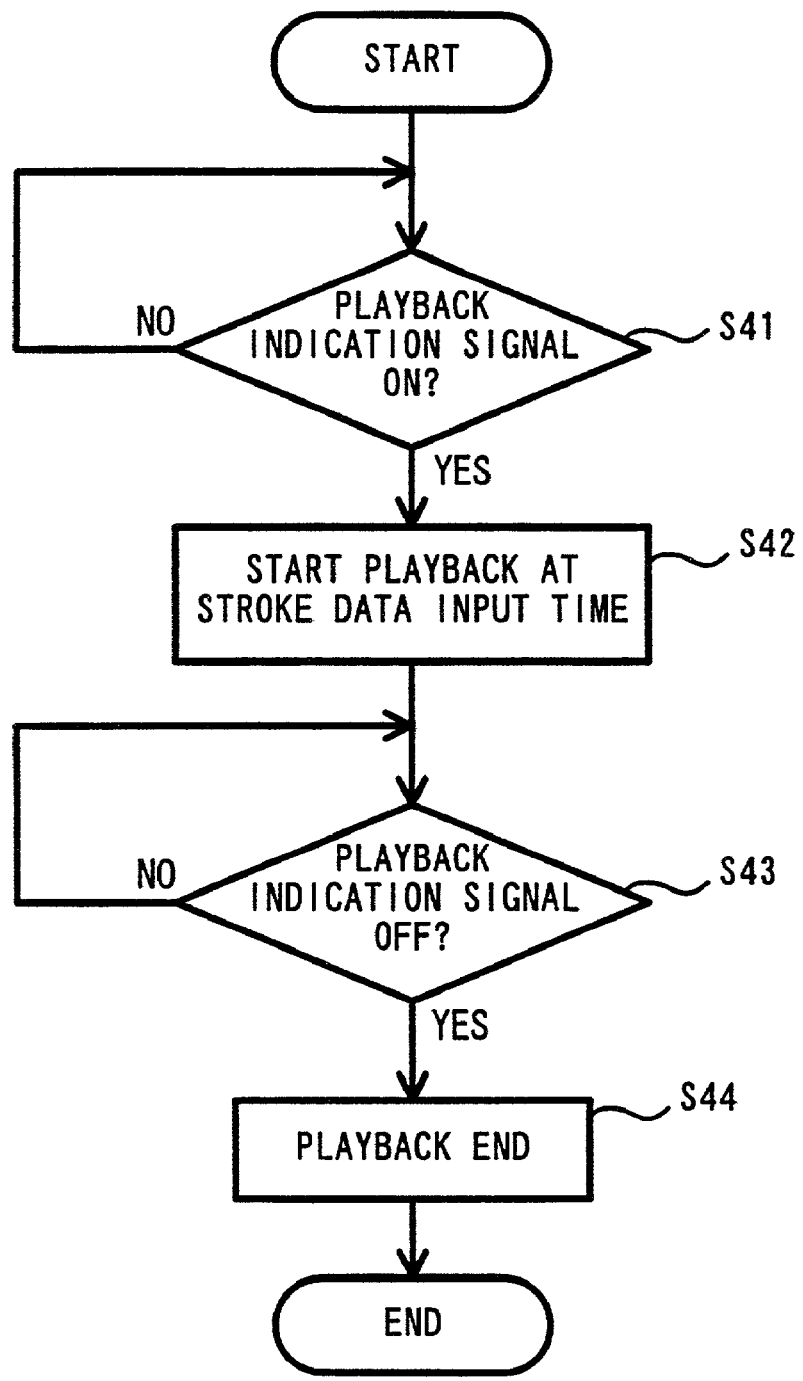
FIG. 7 is a flowchart of the playback process in the information recording and reproducing apparatus of FIG. 1.

When an output signal from the marker 101B is detected by the marker signal detecting unit 301 and the ID information of the output signal is detected by the marker ID detecting unit 304, the playback control unit 307 determines that the playback indication signal is on (see step S41 in FIG. 7).

The playback control unit 307 obtains the coordinate data of the output signal from the marker position detecting unit 302, and refers to the content of a location applicable to the coordinate data, in the first storage area 601 of the address table 600 as shown in FIG. 5. In the applicable location, stored is an address of the storage area 400, which stores the input start time data and the stroke data for the string included in the string area 500. The playback control unit 307 reads the input start time data from the address in the storage area 400, as shown in FIG. 5. The playback control unit 307 searches for a place in the sound data stored in the sound storing unit 308 for a time that agrees with the content of the input start time data, reads the sound data from the place, and outputs the sound data to the reproducing unit 309 sequentially. In this way, the playback of the sound data recorded at the time that agrees with the input start time is started (see step S42 in FIG. 7). In the example shown in FIG. 5, the sound data recorded at time T1 of the sound data 700 is played back.

After the user listens to a necessary part of the sound data, the user designates the position of the string using the marker 101B again. In this exemplary embodiment, the switch 201 of the marker 110B is set to on when the tip 204 of the marker 101B is pressed against the recording sheet 103, and off when pressed again. Therefore, when the position of the string is designated again, a playback end signal is outputted from the signal transmitting unit 203. In various exemplary embodiments, the sound data may be played back only while the marker 101B is pressed against the recording sheet 103.

When the playback end signal is detected by the marker signal detecting unit 301 and the ID information of the signal is detected by the marker ID detecting unit 304, the playback control unit 307 determines that the playback indication signal is off (see step S43 in FIG. 7). Then, the playback control unit 307 outputs a playback end instruction to the reproducing unit 309 and thereby terminating the playback operation (see step S44 in FIG. 7).

According to the above-mentioned exemplary embodiment, the playback operation is easy to utilize by a user. When the user designates the position of a desired string on the tablet, the playback of the sound data is started. When the user again designates the position of the string, the playback of the sound data is ended. As a result, the user can freely adjust a period of time during the playback and efficiently listen to the sound data.

In various other exemplary embodiments, a determination as to whether the playback indication signal is off can be made if the marker 101B is pressed anywhere on the tablet.

Figure 8:
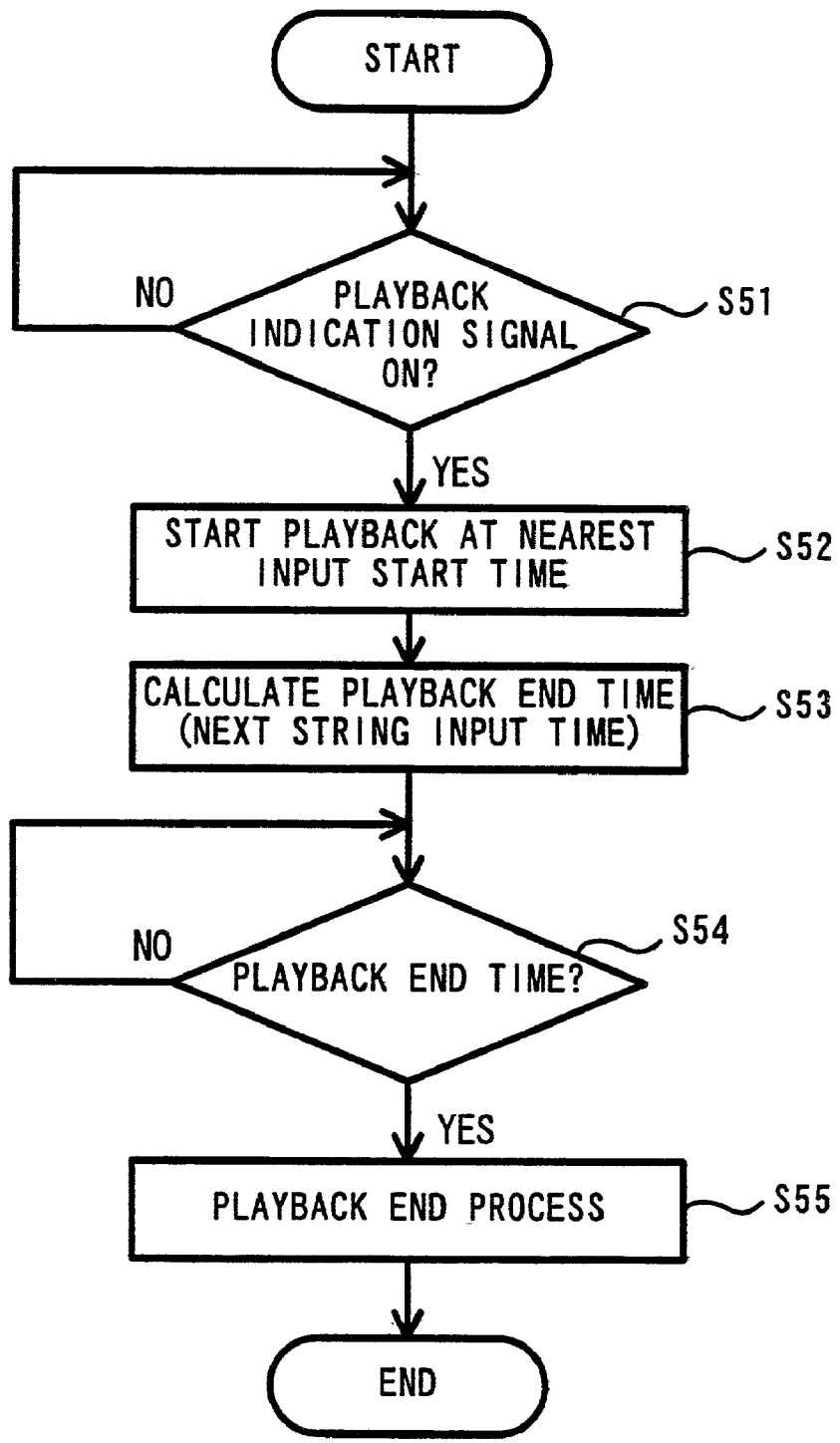
FIG. 8 is a flowchart of a playback process in an information recording and reproducing apparatus in a second exemplary embodiment of the invention.

A second exemplary embodiment of the invention is described with reference to method shown in FIG. 8. Parts in common with the first exemplary embodiment are indicated with the same numerals, and their respective descriptions are omitted for clarity.

This exemplary embodiment shows an example for terminating the playback when the playback of the sound data just reaches the time to start the input of the sound data corresponding to a next string even when the user does not instruct the playback to end.

As with the first exemplary embodiment, when the position of a desired string is designated using the marker 101B, an output signal from the marker 101B is detected by the marker signal detecting unit 301. At step S51, it is determined whether the playback indication signal is on. If the ID information of the output signal is detected by the marker ID detecting unit 304, the playback control unit 307 determines that the playback indication signal is on. If it is determined that the playback indication signal is not on, then the method returns to S51, to continue to determine if the playback indication signal is on.

If in step S51, it is determined that the playback indication signal is on, the method proceeds to step S52, wherein playback of the sound data that is nearest the input start time is started. The playback control unit 307 obtains the coordinate data of the output signal from the marker position detecting unit 302, and refers to the content of a location applicable to the coordinate data, in the first storage area 601 of the address table 600 as shown in FIG. 5. In the applicable location, stored is an address of the storage area 400 storing the input start time data and the stroke data for a string included in the string area 500. The playback control unit 307 reads the input start time data from the address in the storage area 400, as shown in FIG. 5. The playback control unit 307 searches for a place of the sound data stored in the sound storing unit 308 for a time that agrees with the content of the input start time data, and reads the sound data from the place.

The playback control unit 307 outputs the read sound data to the reproducing unit 309 sequentially. In this way, the playback of the sound data recorded at the time that agrees with the input start time of the string is started. In the example shown in FIG. 5, of the sound data 700, the sound data recorded at time T1 is played back.

The method proceeds to step S53, wherein the playback end time is calculated. The playback control unit 307 searches time data whose time is later than and nearest to the time included in the previously read input start time data from the storage area 400, and stores the time data as a playback end time. In other words, the input start time of a string inputted next to the string included in the string area 500, is stored as the playback end time.

At step S54, it is determined if the playback end time has been reached. If the playback time reaches the playback end time, the playback control unit 307 outputs an instruction of the playback end to the reproducing unit 309, terminating the playback operation at step S55. Otherwise, the method continues to loop back to S54 until the playback end time has been reached.

In this exemplary embodiment as mentioned above, when the user designates the position of a desired string, the playback of the sound data is started easily. Also, in this exemplary embodiment, the playback of the sound data is ended automatically, without the need to indicate the end of the playback. For example, the playback of the sound data is ended automatically when the time reaches the input start time of the next string. Therefore, by inputting the string at established intervals, the user can freely adjust the playback time and efficiently listen to the sound data.

Next, a third exemplary embodiment of the invention is described with reference to FIGS. 9 and 10. Parts in common with the first and second exemplary embodiments are indicated with the same numerals, and their descriptions are omitted for clarity.

Figure 10:
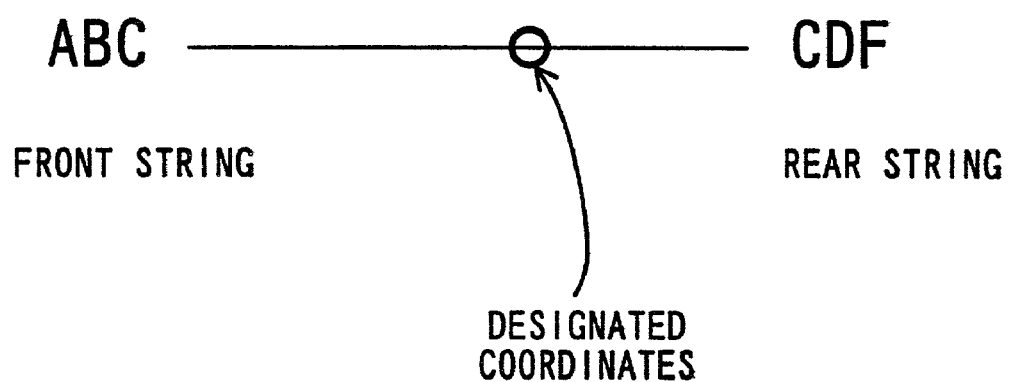
FIG. 10 illustrates a designation of a playback start position in the third embodiment of the invention.

As shown in FIG. 10, this exemplary embodiment shows an example of a process where an intermediate position between two strings is designated by the marker 101B.

Figure 9:
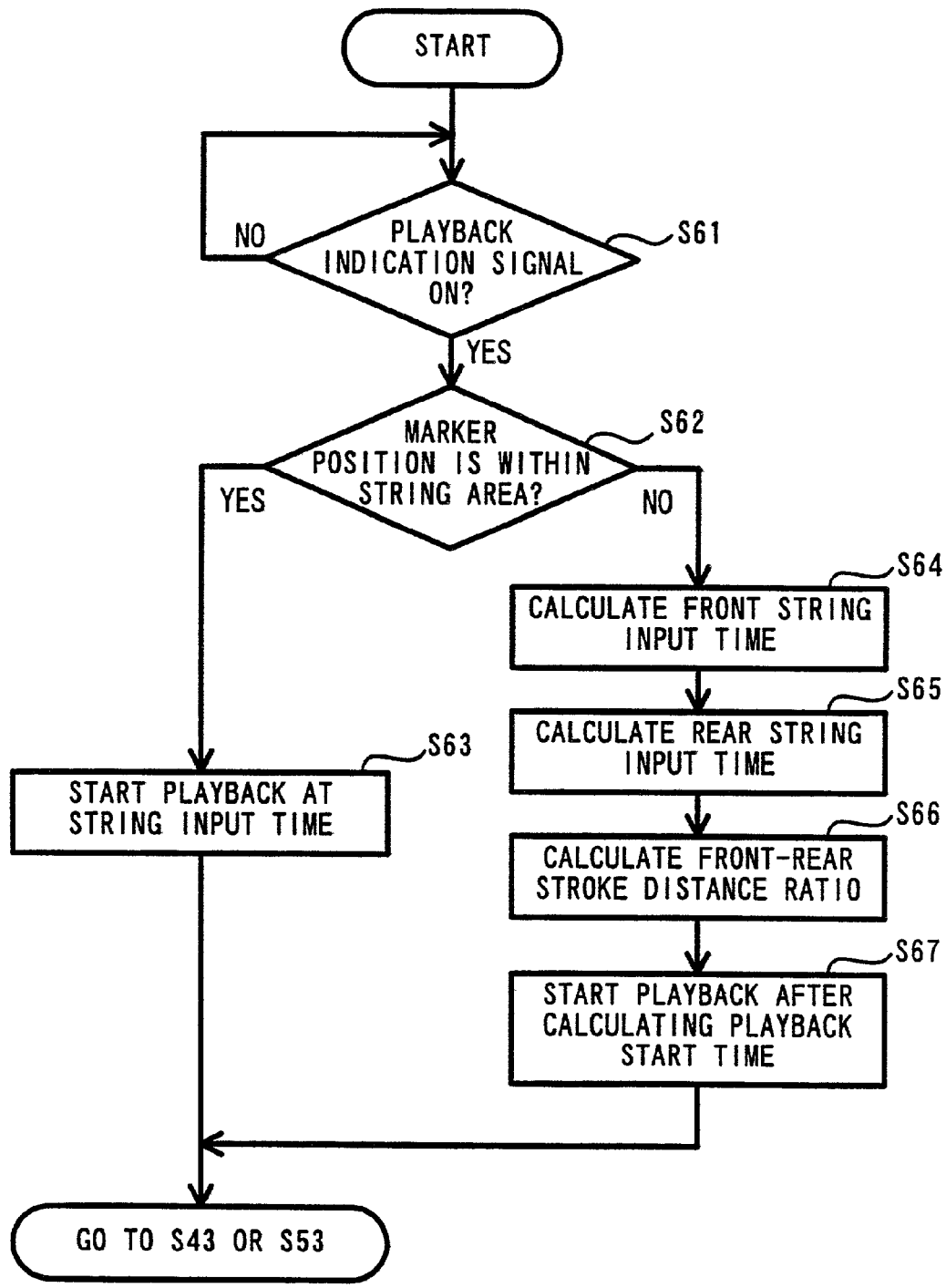
FIG. 9 is a flowchart of a playback process in an information recording and reproducing apparatus in a third exemplary embodiment of the invention.

At step S61 shown in FIG. 9, it is determined whether the playback indication signal is on. Suppose the user designates an intermediate position between a front string ABC and a rear string CDF using the marker 101B, as shown in FIG. 10.

As a result, an output signal from the marker 101B is detected by the marker signal detecting unit 301, the ID information of the output signal is detected by the marker ID detecting unit 304. The playback control unit 307 then determines that the playback indication signal is on and the method proceeds to step S62. Otherwise, the method returns to step S61 to continue to determine if the playback signal is on.

At step S62, it is determined whether the marker position is within a string area. The playback control unit 307 obtains the coordinate data of the output signal from the marker position detecting unit 302, and determines whether an address of the storage area 400 is stored in a location applicable to the coordinate data in the first storage area 601 of the table 600 as shown in FIG. 5.

If an area that does not belong to any string area is designated as shown in FIG. 10, the address of the storage area 400 is not stored in the location and the determination of step S62 is no. In this case, the playback control unit 307 searches for a front string area at step S64, and a rear string area at step S65, that are nearest to the designated coordinates, and obtains input start time data of the string included in each string area, respectively.

At step S66, based on the coordinate data indicating a predetermined position of each string, the playback control unit 307 calculates a front-rear stroke distance. In various exemplary embodiments, the predetermined position is the first position of each string and the front-rear stroke distance is a distance between the coordinate data of the first position of the front string and the coordinate data of the first position of the rear string. Then, relative to the front-rear stroke distance, the playback control unit 307 calculates a distance ratio between a distance from the coordinate data of the designated position to the coordinate data of the first position of the front string, and a distance from the coordinate data of the designated position to the coordinate data of the first position of the rear string.

At step S67, based on the calculated distance ratio, the playback control unit 307 calculates the playback start time from the input start time of the front string and the input start time of the rear string. In various exemplary embodiments, the playback start time is retrieved by calculating a time that divides a duration between the input start time of the front string and the input start time of the rear string with the calculated distance ratio. As with the first and second exemplary embodiments, the playback process is then started.

On the other hand, if an applicable string area is found in step S62, the playback control unit 307 reads the input start time data of a string included in the string area, and starts the playback process at step S63 as is the case with the first and second embodiments.

According to this exemplary embodiment, the playback can be started with an intermediate position between two strings, and the user can visually select the playback start position.

There is a situation where there is no string before a position designated by the marker 101B and there is only a string behind the position. In this situation, a distance between the position and a nearest point on an edge on the recording sheet 103 and forward of the position designated by the marker 101B, and a distance between the position designated by the marker 101B and a predetermined position of the string are calculated. Based on a distance ratio between the above-mentioned distances, the playback start time is retrieved from a time the user performs recording operation and the input start time of the string. In this case, the playback can be started at a time earlier than the input start time of the string.

In the above exemplary embodiments, the magnetic coupling tablet is used to detect the coordinate data. However, the invention is not limited to such a tablet. An ultrasonic tablet, a touch panel or the like may also be used in various exemplary embodiments.

The above exemplary embodiments describe an example of drawing strings on the recording sheet. However, the invention is not limited to such an arrangement. The invention may include a display unit such as a liquid crystal display or the like on which strings can be drawn.

In the above exemplary embodiments, the marker for inputting strings and the marker for indicating playback are separately provided. The invention is not limited to such an arrangement. The functions provided in both markers may be integrated into one marker. Such a marker may be provided with a switch for switching the functions. Instead of the switch, the functions of one marker may be switched by designating a certain area on the tablet or the touch panel. An end of one marker may be used for inputting strings and another end may be used for indicating playback. Further, inputting a string can be simply done in such a manner to write a letter using a pen. Similarly, inputting a playback start signal of the sound data and designating a position to play back the sound data are simply done in such a manner as to designate a letter using a pen. As a result, the playback start of the sound data can be instructed smoothly. In addition, integration of the markers 101A and 101B into one marker can provide cost reductions.

In the above exemplary embodiments, examples are described, wherein the playback start and end points are indicated by designating the same string twice using the marker for indicating playback. The invention is not limited to such an arrangement. The marker may be provided with an on-off switch for switching the start and end of the playback.

It should be understood that the invention is not limited in its application to the details of structure and arrangement of parts illustrated in the accompanying drawings. The invention is capable of other embodiments and of being practiced or performed in various ways without departing from the technical idea thereof, based on existing and well-known techniques among those skilled in the art.

What is claimed is:

1. An information recording and reproducing apparatus, comprising:
    a sound data storing device that stores sound data in association with time data indicating an input time of the sound data;
    a writing information inputting device that includes a position designating portion and that is used for designating positions on an input area using the position designating portion and inputting writing information;
    a handheld playback selecting device that includes a switch and a position designating portion and that outputs a playback start signal of the sound data with the switch in a first position and a playback end signal of the sound data with the switch in a second position;
    a coordinate data detecting device that detects coordinate data of the positions designated by the position designating portion of the writing information inputting device in association with times when the positions are designated by the position designating portion of the writing information inputting device, and that detects coordinate data of the positions designated by the position designating portion of the playback selecting device;
    a writing information unit storing device that stores coordinate data of the positions designated by the writing information inputting device, with the coordinate data divided according to a predetermined condition, as a writing information unit, in association with time data, indicating an input time of the writing information unit; and
    a sound data playback device that starts a playback of sound data from the sound data stored in association with the input time of a writing information unit in response to an output of the playback start signal when playback-designated coordinate data of the position designated by the position designating portion of the playback selecting device is determined to correspond with the writing information unit, wherein:
    when the playback-designated coordinate data is determined not to correspond to a writing information unit, the sound data playback device selects an area nearby the playback-designated coordinate data, calculates a playback start time from a positional relationship between a writing information unit in the area nearby the playback-designated coordinate data and the playback-designated coordinate data and from the input time of the writing information unit, and starts a playback of the sound data from sound data stored in association with the calculated playback start time,
    the sound data playback device continues the playback of the sound data so long as the switch of the playback selecting device is in the first position,
    the sound data playback device finds a first area and a second area which are nearest to the playback-designated coordinate data, the first area having coordinate data smaller than the playback-designated coordinate data and the second area having coordinate data larger than the playback-designated coordinate data, on either X-coordinate or Y-coordinate, and retrieves a time between input times of writing information units in the first and second areas, as a playback start time,
    the sound data storing device starts storing the sound data in response to a sound data storing instruction, and
    when the first area can not be found, the sound data playback device calculates the playback start time by determining a distance ratio between a segment from the playback-designated coordinate data to coordinate data of a nearest position on an edge of the input area included in the first area and a segment from the playback-designated coordinate data to coordinate data of a predetermined position in the writing information unit included in the second area and by calculating a time by dividing a time that is between a time that the sound data storing was instructed and the input time of the writing information unit in the second area based on the distance ratio.

2. An information recording and reproducing apparatus, comprising:
    a sound data storing device that stores sound data in association with time data indicating an input time of the sound data;
    a writing information inputting device that includes a position designating portion and that is used for designating at least one of a plurality of positions on an input area using the position designating portion and inputting writing information;
    a handheld playback selecting device that includes a switch and a position designating portion and that outputs a playback start signal of the sound data with the switch in a first position and a playback end signal of the sound data with the switch in a second position;
    a coordinate data detecting device that detects coordinate data of positions designated by the position designating portion of the writing information inputting device in association with times when the positions are designated by the position designating portion of the writing information inputting device, and that detects coordinate data of positions designated by the position designating portion of the playback selecting device;

a writing information unit storing device that stores coordinate data of positions designated by the writing information inputting device, with the coordinate data divided according to a predetermined condition, as a writing information unit, in association with time data indicating an input time of the writing information unit; and a sound data playback device that plays back sound data stored from the input time of a writing information unit till the input time of a next writing information unit, in response to an output of the playback start signal, when playback-designated coordinate data of a position designated by the position designating portion of the playback selecting device is determined to correspond with the writing information unit, wherein:

the sound data playback device finds a first area and a second area which are nearest to the playback-designated coordinate data, the first area having coordinate data smaller than the playback-designated coordinate data and the second area having coordinate data larger than the playback-designated coordinate data, on either X-coordinate or Y-coordinate, and retrieves a time between input times of writing information units in the first and second areas, as a playback start time, the sound data storing device starts storing the sound data in response to a sound data storing instruction, and when the first area cannot be found, the sound data playback device calculates the playback start time by finding the distance ratio between a segment from the playback-designated coordinate data to coordinate data of a nearest position on an edge of the input area included in the first area and a segment from the playback-designated coordinate data to coordinate data of a predetermined position in the writing information unit included in the second area and by calculating a time by dividing a time that is between a time that the sound data storing was instructed and the input time of the writing information unit in the second area based on the distance ratio.

* * * * *